US 8,256,007 B2

(12) United States Patent
Dossett et al.

(10) Patent No.: US 8,256,007 B2
(45) Date of Patent: Aug. 28, 2012

(54) DATA SECURITY MANAGEMENT SYSTEM AND METHODS

(75) Inventors: Gregory Eugene Dossett, Eldersburg, MD (US); William Edward Freeman, Sykesville, MD (US); Daniel Arthur Jacques, Clarksville, MD (US); Chimaeze Obinna Chikeka, Baltimore, MD (US); Thomas Michael Moses, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 745 days.

(21) Appl. No.: 12/054,798

(22) Filed: Mar. 25, 2008

(65) Prior Publication Data
US 2009/0249060 A1    Oct. 1, 2009

(51) Int. Cl.
*H04L 29/06* (2006.01)
(52) U.S. Cl. .............................. 726/26; 713/193; 380/44
(58) Field of Classification Search .................. 380/44, 380/45, 47; 713/171, 189, 193; 726/4, 5, 726/10, 26, 27, 28, 29, 30
See application file for complete search history.

(56) References Cited

U.S. PATENT DOCUMENTS

| | | | |
|---|---|---|---|
| 6,265,704 B1 | 7/2001 | Livingston | |
| 7,111,173 B1 * | 9/2006 | Scheidt | 713/186 |
| 7,577,999 B2 * | 8/2009 | Narin et al. | 726/27 |
| 7,639,805 B2 * | 12/2009 | Li et al. | 380/201 |
| 7,644,446 B2 * | 1/2010 | Strom et al. | 726/32 |
| 7,725,945 B2 * | 5/2010 | Ripley et al. | 726/27 |
| 7,751,569 B2 * | 7/2010 | Caronni et al. | 380/277 |
| 7,756,271 B2 * | 7/2010 | Zhu et al. | 380/200 |
| 7,805,616 B1 * | 9/2010 | Mohammed et al. | 713/189 |
| 7,885,894 B2 * | 2/2011 | Shimoji et al. | 705/51 |
| 7,900,250 B1 * | 3/2011 | Fedyk et al. | 726/15 |
| 2002/0031230 A1 * | 3/2002 | Sweet et al. | 380/278 |
| 2004/0139315 A1 * | 7/2004 | Tokutani et al. | 713/156 |
| 2004/0158731 A1 * | 8/2004 | Narin et al. | 713/200 |
| 2006/0123484 A1 * | 6/2006 | Babic et al. | 726/26 |
| 2007/0056036 A1 | 3/2007 | Focke et al. | |
| 2007/0156587 A1 * | 7/2007 | Yu et al. | 705/50 |
| 2007/0172067 A1 * | 7/2007 | Otal et al. | 380/277 |
| 2007/0276760 A1 * | 11/2007 | Kanehara et al. | 705/59 |
| 2007/0288386 A1 * | 12/2007 | Adachi et al. | 705/58 |

(Continued)

OTHER PUBLICATIONS

Zhang, Jiang; Chen, Chun-Xiao; Luo, Jian-Guang; Yang, Shi-Qiang; "An Efficient Right-granting Model with Hierarchical Group Rights for Large-scale Content Distribution", IMACS Multiconference on Computational Engineering in Systems Applications, Oct. 4-6, 2006, pp. 1228-1235.*

(Continued)

*Primary Examiner* — Carl Colin
*Assistant Examiner* — Victor Lesniewski
(74) *Attorney, Agent, or Firm* — Tarolli, Sundheim, Covell & Tummino LLP

(57) ABSTRACT

A system is provided for managing security rights of protected data having a plurality of security groups. The system comprises a client configured to generate the protected data, wherein a user of the client is a member of a subset of the plurality of security groups. The client comprising a key generator configured to generate a plurality of security group keys, wherein each membership key is associated with a security group selected by the user of the client and a combination key generator configured to generate a combination key based on the plurality of security group keys, wherein the client is configured to encrypt the protected data with the combination key.

19 Claims, 6 Drawing Sheets

U.S. PATENT DOCUMENTS

| | | | | |
|---|---|---|---|---|
| 2007/0288391 | A1* | 12/2007 | Nakamura et al. | 705/59 |
| 2008/0019528 | A1* | 1/2008 | Kneissler | 380/279 |
| 2008/0027871 | A1* | 1/2008 | Seo | 705/59 |
| 2008/0097923 | A1* | 4/2008 | Kim et al. | 705/59 |
| 2008/0263370 | A1* | 10/2008 | Hammoutene et al. | 713/193 |
| 2010/0095118 | A1* | 4/2010 | Meka | 713/168 |

OTHER PUBLICATIONS

Liu, Zonghua; Wang, Bohyun; Lee, Byungwook; Han, Myung-Mook; "Security License Distribution Mechanism for Rights Delegation Models of Group Distribution between Consumers", International Conference on Computational Science and its Applications, Aug. 26-29, 2007, pp. 144-152.*

Horiuchi, K.; Yoshikawa, T.; "The new method of license key management for content distribution system key management for grouping content", International Conference on Consumer Electronics, IEEE, Jun. 17-19, 2003, pp. 56-57.*

Liu, Zonghua; Liu, Guangqing; Kim, Tae-min; Lee, Byungwook; Han, Myung-Mook; "Flexible License Management Mechanism for Group Distribution", Future Generation Communication and Networking, IEEE, Dec. 6-8, 2007, pp. 548-552.*

Feng, Min; Zhu, Bin; "A DRM System Protecting Consumer Privacy", Consumer Communications and Networking Conference, IEEE, Jan. 10-12, 2008, pp. 1075-1079.*

* cited by examiner

DATA SECURITY MANAGEMENT SYSTEM AND METHODS

TECHNICAL FIELD

The present invention relates generally to data security, and more particularly to a data security management system and methods.

BACKGROUND

Digital rights management (DRM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user views or 'plays' the digital content with the aid of an appropriate rendering device such as a personal computer or the like.

Additionally, some DRM systems, such as a MICROSOFT WINDOWS® server include rights management services (RMS) functionality. Such DRM systems allow an owner of data to specify particular groups of users that can access a file, as well as security role privileges for the file.

SUMMARY

One aspect of the present invention is related to a system for managing security rights of protected data, the system having a plurality of security groups. The system comprises a client configured to generate the protected data, wherein a user of the client is a member of a subset of the plurality of security groups. The client comprises a key generator configured to generate a plurality of security group keys, wherein each security group key is associated with a security group selected by the user of the client and a combination key generator configured to generate a combination key based on the plurality of security group keys, wherein the client is configured to encrypt the protected data with the combination key. The client also comprises an issuance license generator that generates an issuance license that includes the plurality of security group keys. The system also comprises a server configured to authenticate the user of the client, encrypt the security group keys in the issuance license and return the issuance license with the encrypted security group keys to the client.

Another aspect of the present invention is related to a method for storing protected data, the method comprising generating the protected data and selecting security group membership requirements for the protected data, wherein the security group membership requirements comprises membership to each of a subset of a plurality of security groups. The method also comprises generating an issuance license for the protected data that identifies the security group membership requirements for the protected data and a unique security group key for each security group selected. The method further comprises encrypting the security group keys of the issuance license and generating a combination key based on the security group keys. The method yet further comprises encrypting the protected data with the combination key.

Yet another aspect of the present invention is related to a computer readable medium having computer executable instructions stored therein. The computer executable instructions, when executed performing a method. The method comprising requesting security group access to the protected data by a user and identifying the security group membership requirements of the protected data, wherein the membership requirements include membership to each of a subset of a plurality of security groups. The method also comprises determining if the user is a member of each and every security group of the security group membership requirements and decrypting a plurality of security group keys in an issuance license associated with the protected data, wherein a given key is associated with a given security group. The method further comprises generating a combination key with the plurality of security group keys. The method yet further comprises decrypting the protected data with the combination key.

DETAILED DESCRIPTION

The present system is related to a data security management system that uses two separate layers of encryption for protected data. To implement the first layer of encryption, namely security group encryption, a computer can generate an issuance license for the protected data that includes an encryption key for each of a plurality of security groups selected by a user of the computer. In such a system, the protected data can be encrypted with a combination key that can be generated using a one-way hashing function with all the security group keys included in the issuance license for the protected data. The system can be implemented such that only a user who is a member of each and every security group identified in the issuance license for the protected data can decrypt the data encrypted by the combination key.

Additionally, the second layer of encryption, namely role encryption, can limit access to the protected data by assigning certain privileges (e.g., viewing, printing and editing) of the protected data to particular security roles. The system can be implemented such that only a user who is assigned a security role and is a member of each and every security group identified in the issuance license for the protected data can access the protected data.

Figure 1:
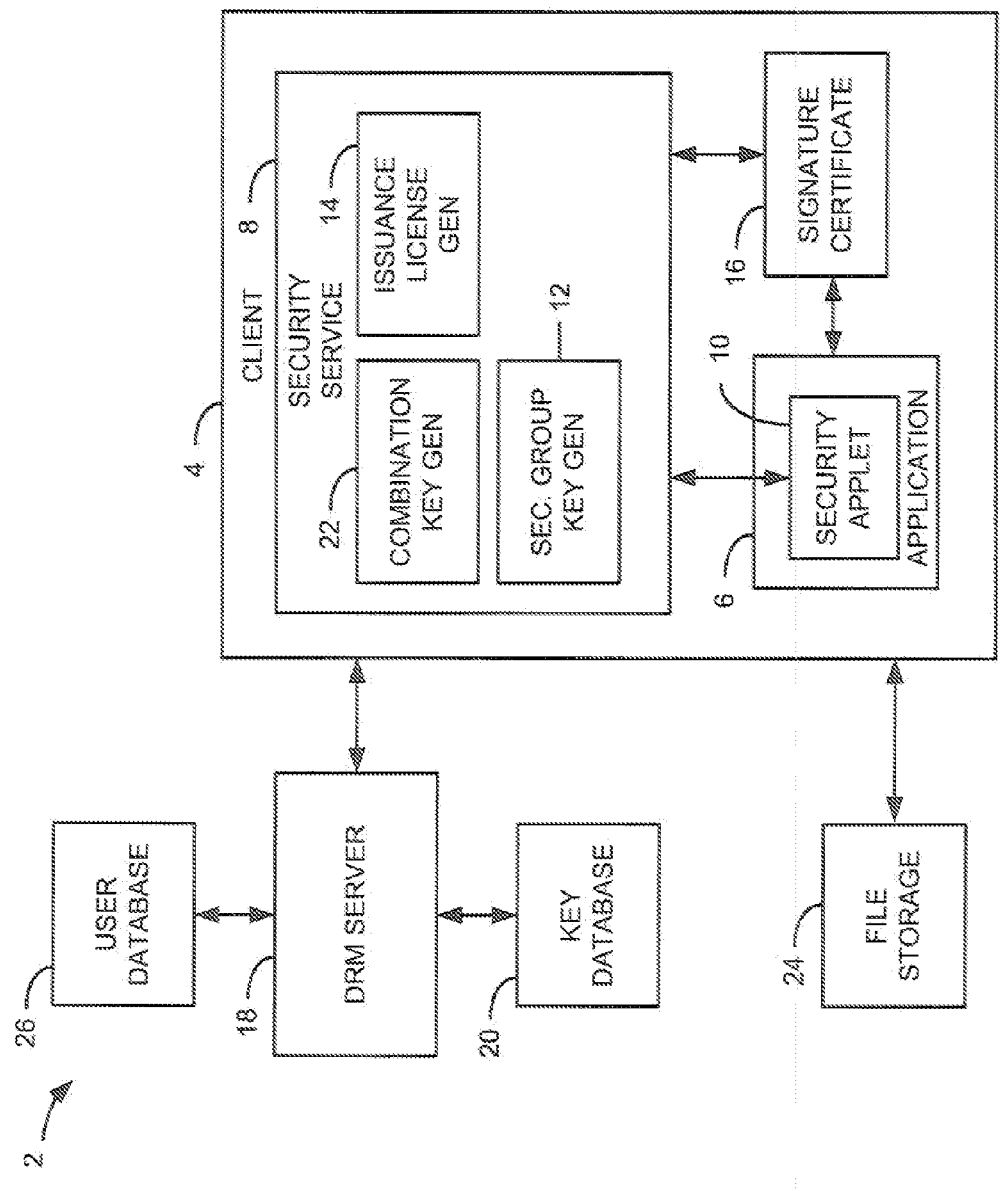
FIG. 1 illustrates a block diagram of a system for managing security rights in accordance with an aspect of the invention.

FIG. 1 illustrates a security management system 2 in accordance with an aspect of the invention. In the present example, the security management system 2 can employ a plurality of security groups (e.g., security compartments), wherein each user in the security management system 2 can be a member of one or more of the plurality of security groups. Each security group could correspond, for example, to a group of users with a common responsibility (e.g., members of a business project, members of a military organization or compartment, etc.).

The system includes a client 4 that can generate a file with data that needs to be protected. The client 4 could be implemented, for example, as a computer with a graphical user interface. The protected data could be generated and edited by, for example, an application 6, such as an Office Suite application (e.g., MICROSOFT OFFICE®, OPENOFFICE.ORG®, STAROFFICE®, etc.), by an email system (e.g., MICROSOFT OUTLOOK®, NOVELL GROUPWISE®, etc.) or a media player (e.g., MICROSOFT WINDOWS® MEDIA PLAYER, APPLE QUICKTIME®, etc.) being executed on the client 4. Such protected data could include, for example, classified information (e.g., top secret, secret, etc.) such as text, spreadsheets and audio/visual material. The client 4 can include a security service 8 to manage security access to the protected data.

The security service 8 could be implemented, for example, as a service (e.g., an application) for a computer operating system (e.g., MICROSOFT WINDOWS®, Linux, UNIX, etc.). Additionally, an add-on (e.g., plug-in) security applet 10 for the application 6 can be implemented to communicate with the security service 8. The security applet 10 can be activated, for example, when the application 6 attempts to store (e.g., "save") or extract (e.g., "cut" or "copy") the protected data.

When a storing or extraction of the protected data is detected, the security applet 10 can extract the protected data (e.g., text) and send the extracted data to the security service 8. Additionally, the security applet 10 can provide a user of the client 4 with security options for the protected data. The security options can include, for example, a list of security groups. In the present example, the user of the client 4 can limit access to the protected data to users who are members of each and every security group selected.

Upon receiving the extracted data, as well as the security options from the security applet 10, the security service 8 can employ a security group key generator 12 to create a unique security group key for each security group selected by the user of the client 4. The unique security group keys could each be implemented, for example, as a 128-bit symmetric encryption key. The unique security group keys can be provided to an issuance license generator 14 that creates an security group issuance license for the protected data, wherein the security group issuance license includes the unique security group keys as a well as a header that identifies the security group membership requirements for the protected data.

The security service 8 can digitally sign the security group issuance license by employing a (digital) signature certificate 16 that is bound (by a certificate management system) to the user of the client 4. The security service 8 can provide the signed security group issuance license to a DRM server 18, such as a MICROSOFT WINDOWS® server with Rights Management Service (RMS) functionality. The issuance license can be protected by employing public-key encryption techniques when transmitting the issuance license to the DRM server 18. Upon reception of the signed security group issuance license, the DRM server 18 can authenticate the user of the client 4, for example, by verifying the digital signature of the security group issuance license using authentication techniques well known in the art.

The DRM server 18 can encrypt the security group keys in the security group issuance license to form an encrypted security group issuance license. The security group keys can be encrypted, for example, with a public key of the DRM server 18, such that the security group keys could be decrypted with the corresponding private key. Alternatively, the DRM server 18 could be configured to generate a new symmetric encryption key and encrypt the security group keys with the newly generated symmetric encryption key, and store the newly generated symmetric encryption key in a key database 20. The DRM server 18 can return the encrypted security group issuance license to the security service 8. In some implementations (e.g., the DRM server 18 is configured to generate a new symmetric encryption key for the security group issuance license), the symmetric encryption key employed to encrypt the security group issuance license can included (in encrypted form) with the encrypted security group issuance license returned to the security service 8. In such a situation, the symmetric encryption key could be encrypted, for example, with the public key of the DRM server 18, which could, for example, eliminate the need for the key database 20.

The security service 8 can employ a combination key 22 generator to generate a combination key. The combination key can, for example, be generated with a one-way hashing function with each and every unique security group key as the input of the one-way hashing function. The combination key can be employed to encrypt the extracted data (provided by the security applet 10). Typically, after encryption, the combination key is discarded (e.g., deleted) for security reasons. The security service 8 can provide the encrypted protected data, along with the encrypted security group issuance license (which can be referred to collectively as group encrypted data) to the security applet 10. The security applet 10 can cause the application 6 to swap (e.g., replace) the protected data with the group encrypted data.

Additionally, the application 6 can employ a DRM session (e.g., an RMS session) to create security privileges associated with security roles for the protected data. In such a situation, the application 6 can create one or more role keys, wherein each role key allows for certain document privileges based on the security roles. As an example, security roles can define typical activities associated with a user assigned with a particular security role. For instance, a user with a role of "reporter" might be able to view a file's contents, but would be prohibited from printing or modifying the content of the file. A user with an "analyst" role might be able to view and print the content, but may not be able to modify the contents of the document. A user with a "data owner" role could have full control of the file and its contents (e.g., viewing, printing and modification privileges). One of ordinary skill will appreciate the wide spectrum of security roles that could be implemented with a DRM system. The application 6 can generate a security role issuance license that includes the security role keys. The application 6 can provide a request for security role encryption to the DRM server 18. The request can include for example, the security role issuance license. The request can be digitally signed using the signature certificate 16.

Upon reception of the request, the DRM server 18 can authenticate the user of the client 4 with the digital signature of the request. The DRM server 18 can be configured to encrypt and sign the security role license (that includes the role keys) using a second key generated on the DRM server 18. The role keys can be employed by the security applet 10 to encrypt the data already encrypted by the combination key (which was generated with the security group keys in the combination key generator 22) to form doubly encrypted data. The doubly encrypted data can be returned to the security service 8, which can provide the security applet 10 with the doubly encrypted data. The security applet 10 can swap (e.g., replace) the group encrypted data in the file for the doubly encrypted data. The file can then be stored, for example, in file storage 24 (e.g., a file database, a storage medium such as a hard disk associated with the client 4, etc.).

At a later time, the same or a different client 4 can request access to the file with the protected data (which is doubly encrypted). However, for purposes of simplification of explanation, it will be assumed that the same client 4 is requesting access to the protected data. As an example, the application 6 running on the client 4 can attempt to "open" or "paste" data from the file. As discussed above, the doubly encrypted file could be stored in the file storage 24.

When the application 6 opens the file, the application 6 can create a DRM session (e.g., an RMS session) with the DRM server 18 by sending a digitally signed request for access to the file. The signed request can include, for example, the security role issuance license which specifies the role access permissions. The DRM server 18 can authenticate a user of the client 4, for example, by authenticating the digital signature of the request. The DRM server 18 can check a user database 26 to determine a security role for the user. The DRM server 18 can issue an end-user role license, which can be protected by a public key associated with the user, and grant role-based access and the keys necessary for decrypting the doubly encrypted data to reveal a portion of the group encrypted data (e.g., encrypted data protected by the security group keys and the security group issuance license). Once revealed, the group encrypted data can be provided to the security applet 10. The security applet 10 can swap the doubly encrypted data for the group encrypted data. Additionally, the security applet 10 forwards the group encrypted data to the security service 8.

The security service 8 can extract the encrypted security group issuance license from the group encrypted data. The encrypted security group issuance license can be digitally signed (with the signature certificate 16) and provided to the DRM server 18. After authenticating the user of the client 4 (by employing the digital signature), the signed and encrypted security group issuance license can be examined by the DRM server 18 to determine the security group membership requirements for the protected data. The DRM server 18 can access the user database 26 to determine which security groups the user of the client 4 belongs. The DRM server 18 can generate an end-user security group license that includes each security group key from the security group issuance license that the user is authorized to access based on the user's security group membership privileges that are stored in the user database 26. If the user meets the membership requirements for each and every group specified in the security group issuance license, the combination key generator 22 can successfully recreate the combination encryption key used to encrypt the group encrypted data. The generated combination key can be used to decrypt at least a portion of the group encrypted data to reveal the protected data since the user is a member of all security group identified in the security group issuance license. However, if the user lacks membership to even one of the security groups identified in the security group issuance license, the combination key will not be successfully generated by the combination key generator 22. The protected data can be provided to the security applet 10, which can swap (e.g., replace) the group encrypted data for the protected data. The application 6 can then show (e.g., display and/or play) the user of the client 4 to protected data.

Employment of the security management system 2 allows for a very flexible, scalable and secure environment. Increase flexibility is achieved by allowing for greater specificity of security privileges (e.g., security groups) than employment of DRM privileges (e.g., RMS privileges) alone. Scalability is increased since a combination key need not be stored for each combination of security groups for each unique set of security group keys. Moreover, since the security group keys are unique for each file, even if a security breach of the client 4 occurs, a malicious user (e.g., a hacker) would only be able to access the one file associated with the unique security group keys, thereby increasing the security of the environment.

Figure 2:
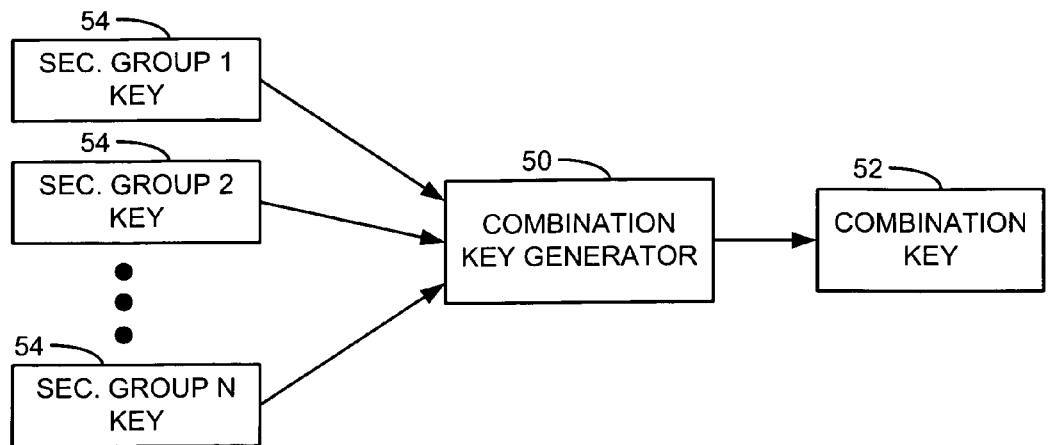
FIG. 2 illustrates an example of a combination key generator in accordance with an aspect of the invention.

FIG. 2 illustrates an example of a combination key generator 50 in accordance with an aspect of the invention. The combination key generator 50 could be implemented, for example, as the combination key generator 50 illustrated in FIG. 1. The combination key generator 50 includes a one-way hashing function that creates a 128-bit symmetric combination key 52 based on N security group keys 54, where N is an integer greater than or equal to one. The combination key generator 50 is configured such that for each set of security group keys input into the combination key generator 50, exactly one symmetric combination key 52 exists. Thus, a user must possess each and every security group key 54 employed to generate the symmetric combination key 52 in order to re-create the symmetric combination key 52 at a later time.

Figure 3:
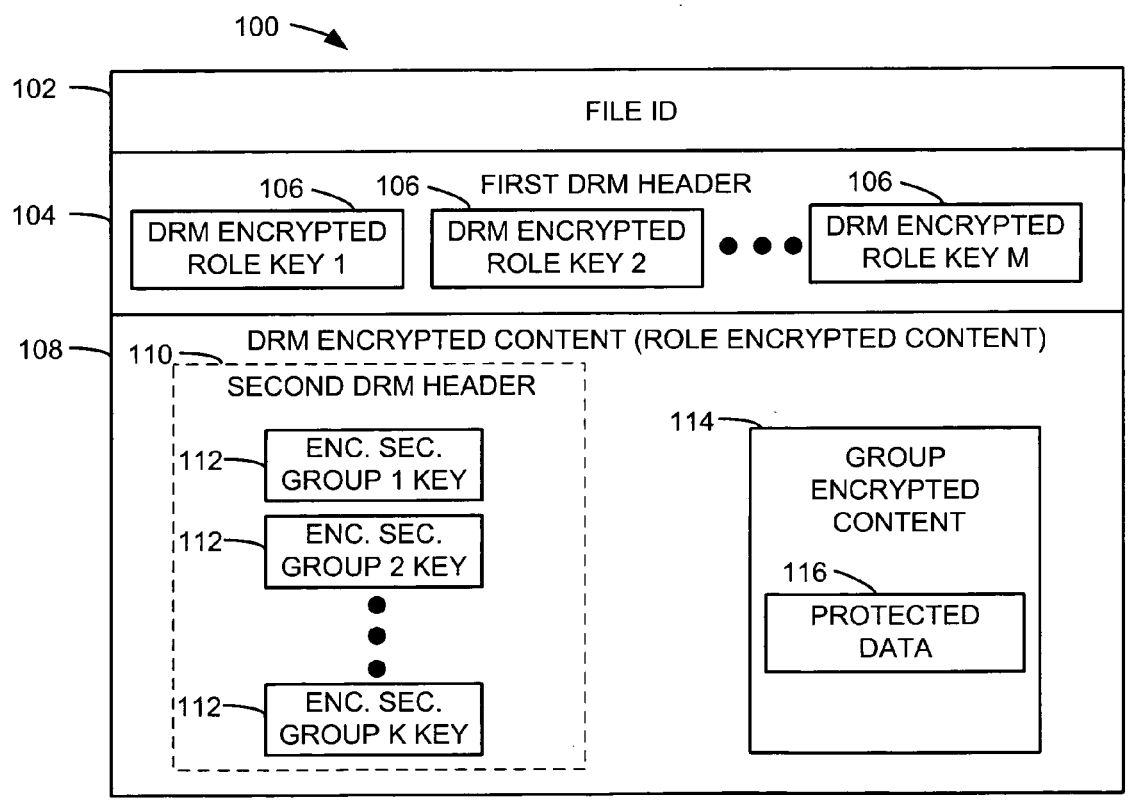
FIG. 3 illustrates a diagram of a file with protected data in accordance with an aspect of the invention.

FIG. 3 illustrates a diagram of a file 100 with doubly encrypted data in accordance with an aspect of the invention. The file can include a file ID 102 that could be implemented, for example, as a filename. The file 100 can also include a plain text DRM header section 104 that includes M number of DRM encrypted role keys 106 (e.g., a security role issuance license), where M is an integer greater than or equal to one. The role keys 106 (when decrypted) allow a system to perform specific operations on the file 100, such as view, print and modify the contents of the file 100.

The file 100 also includes a section of data 108 (e.g., role encrypted content) that is encrypted with a DRM encryption system (e.g., an RMS encryption system). The DRM encrypted section 108 can include, for example, a second plain text (once the role encrypted content is decrypted to reveal group encrypted data) DRM header section 110 that includes K number of encrypted security group keys 112 (e.g., a security group issuance license), where K is an integer greater than or equal to one. Each of the security group keys 112 can be encrypted with a second layer of DRM encryption in a manner described above with respect to FIG. 1, such that the security group keys 112 are encrypted with two layers of encryption.

The DRM encrypted content can also include security group encrypted content 114 that contains protected data 116. The security group encrypted content can be encrypted by a combination key that is generated with a one-way hashing function with all of the security group keys 112. The file 100 can be configured such that only a possessor of both, at least one decrypted role key 106 and each and every decrypted security group key 112 in the file 100 can decrypt the protected data 116.

Figure 4:
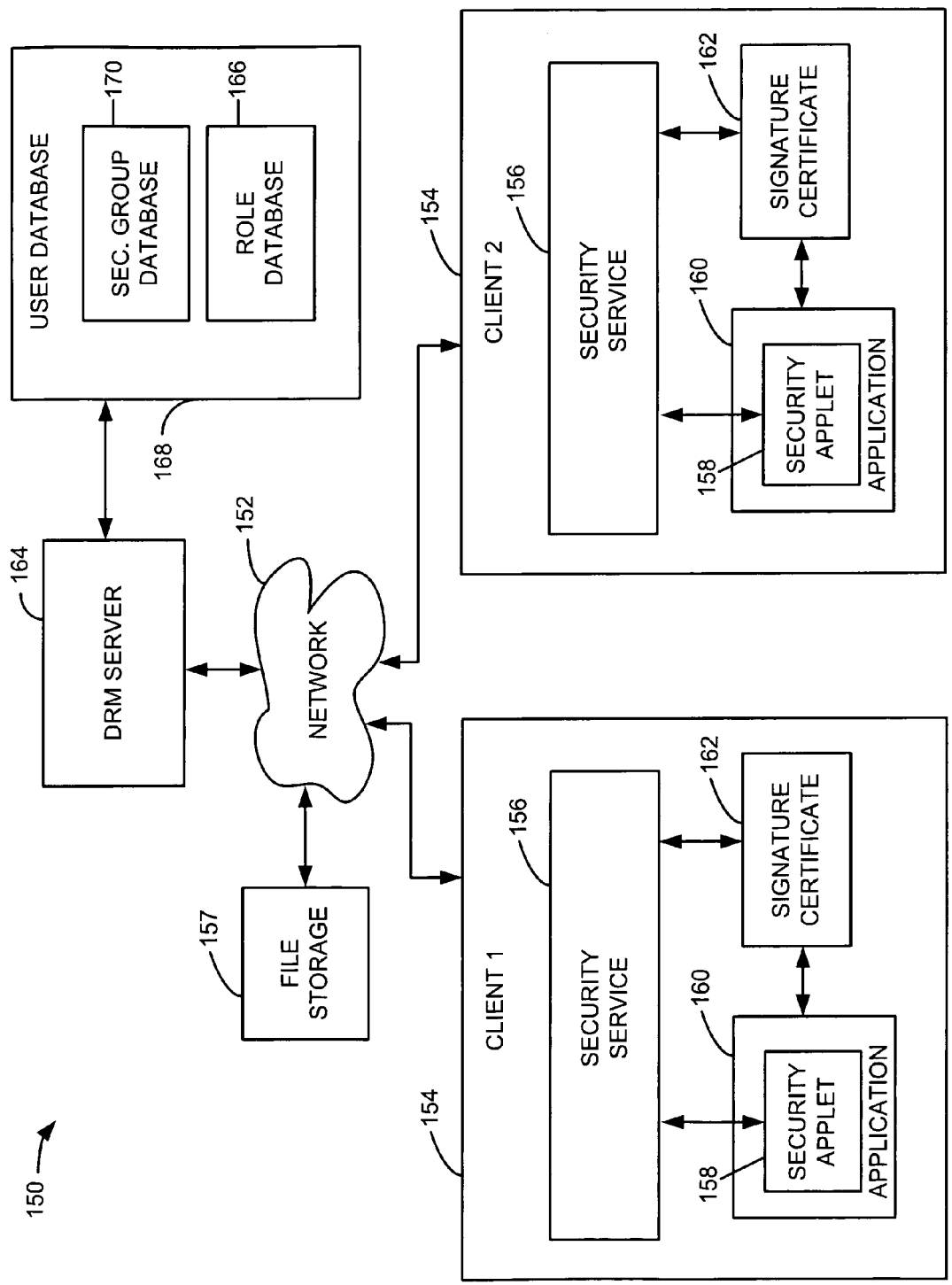
FIG. 4 illustrates another example of a system of managing security rights in accordance with an aspect of the invention.

FIG. 4 illustrates another example of a security management system 150 in accordance with an aspect of the invention. The security management system 150 includes network nodes communicating over a network 152. The network 152 could be implemented, for example, as a plurality of data hubs and/or data switches that allow two-way communication between nodes of the network 152. The network 152 could be implemented on a public network (e.g., the Internet), on a private network (e.g., a local area network) or a combination thereof (e.g., a virtual private network). The nodes of the network 152 can communicate, for example, using a communications protocol, such as the Transmission Control Protocol/Internet Protocol (TCP/IP).

The network nodes illustrated in FIG. 4 include two clients 154; although one skilled in the art would appreciate that more (or less) clients 154 could be implemented. Each client 154 could be implemented, for example as a computer with a graphical user interface. Each client 154 can include a security service 156 that protects sensitive data (hereinafter, "protected data"). The security service 156 can communicate with a security applet 158 that is executing in an application 160 (e.g., an Office Suite, an email system, a media player, etc.). The security applet 158 detects when certain application events occur (e.g., file open, file save, copy, paste, etc.).

For instance, when the security applet 158 detects an application event that indicates the protected data is to be stored (e.g., file save or copy), the security applet 158 prompts a user of a client 154 (e.g., CLIENT 1) to select which of a plurality of security groups an accessing user must belong to before access will be granted to the file being manipulated. In the present security management system 150, the accessing user must be a member of each and every security group selected by the user of the client 154. Upon selecting the security groups, the security applet 158 extracts the protected data and provides the protected data to the security service 156.

The security service 156 can generate a unique key for each of the security groups selected by the user of the client 154. The security service 156 can generate a security group issuance license that includes the generated security group keys. The security service 156 can digitally sign the security group issuance license with a signature certificate 162 that is bound to the user of the client 154 (by a certificate management system) and provide the signed security group issuance license to a DRM server 164 that could be implemented, for example, as a MICROSOFT WINDOWS® server with RMS functionality. The DRM server 164 can authenticate the user of the client 154 (e.g., by authenticating the digital signature). The DRM server 164 can also encrypt the security group keys of the security group issuance license to form an encrypted security group issuance license, using for example, either the DRM server's 164 public-key or a newly generated symmetric encryption key. If the DRM server 164 is configured to generate a new symmetric encryption key, the newly generated symmetric encryption key can be included (and encrypted with the DRM server 164's public key) in the encrypted security group issuance license. The DRM server 164 can return the encrypted security group issuance license to the security service 156.

Upon reception of the encrypted security group issuance license, the security service 156 can generate a combination key using the security group keys generated for the security group issuance license. The combination key can be a symmetric encryption key that can be generated, for example, by employing a one-way hashing function with the security group keys, such as the combination key generator 50 illustrated in FIG. 2. The combination key can be used to encrypt the protected data. Subsequently, for security purposes, the combination key can be discarded (e.g., deleted). The encrypted protected data and the encrypted security group issuance license can be collectively referred to as group encrypted data. The group encrypted data can be sent to the security applet 158. The security applet 158 can swap (e.g., replace) the protected data in the file of the application 160 with the group encrypted data.

The application 160 can create a separate DRM session with the DRM server 164. The application 160 can prompt the user of the client 154 to select role security privileges for particular security roles. For example, the security system could be implemented such that users with a role of "reporter" can view the contents of the file, but cannot print or edit the file. Users with a role of "analyst" can view and print the file, but cannot edit the file, while users with a role of "data owner" can have full access rights to the file, including viewing, printing and editing privileges. Upon selection of the role security privileges, the application 160 can generate role keys that can be employed to grant the role security privileges. The application 160 can also generate a security role issuance license that includes the generated role keys and the security role privileges selected by the user.

The application 160 can then provide the security role issuance license (that includes the security role keys and requested security role privileges) to the DRM server 164 in a role encryption request. Additionally, the application 160 can employ the signature certificate 162 to digitally sign the role encryption request. The DRM server 164 can authenticate the user of the client 154, for example, by authenticating the digital signature of the role encryption request. Additionally, the DRM server 164 can encrypt the security role issuance license using a DRM key (e.g., a public key of the DRM server, or a symmetric encryption key generated for the role encryption request) of the DRM server 164, thereby forming an encrypted security role issuance license. The encrypted security role issuance can be returned to the application 160. The application 160 can employ the security role keys to encrypt the group encrypted data thereby doubly encrypting the protected data. The group encrypted data and the encrypted security role issuance license can be collectively referred to as doubly encrypted data. The doubly encrypted data can be returned to the application 160, where the application 160 can swap (e.g., replace) the group encrypted data for the doubly encrypted data. The application 160 can then save the file (with the doubly encrypted protected data) to a file storage (e.g., a file database, a local storage medium, such as a hard disk associated with the client 154, etc.). One skilled in the art will appreciate the various data storage areas that could be employed to store the file.

Subsequently, when another client 154 (e.g., CLIENT 2) attempts to access the file in the application 160, the application 160 sends a digitally signed (with the signature certificate 162) request for access to the file. The signed request can include at least a portion of the doubly encrypted data, such as the encrypted security role issuance license. The DRM server 164 receives the signed request and authenticates the user, for example, by authenticating the digital signature of the request. The DRM server 164 accesses a role database 166 of a user database 168 to identify one or more security roles assigned to the user. The DRM server 164 can decrypt at least a portion of the doubly encrypted data to reveal the role keys. The DRM server 164 can generate an end-user role security license that includes the role keys for security roles assigned to the user of the client 154. The end-user role security license can be provided to the application 160.

The application 160 employs the returned role keys (provided in the end-user security role license) to decrypt the doubly encrypted data to reveal the group encrypted data. The security applet 158 (running on the application 160) forwards the group encrypted data to the security service 156. The security service 156 extracts the encrypted security group issuance license from the group encrypted data and digitally signs the encrypted security group issuance license using the signature certificate 162 of the accessing user. The security service 156 forwards the signed and encrypted security group issuance license to the DRM server 164.

The DRM server 164 authenticates the user accessing the file by authenticating the digital signature. The DRM server 164 examines the encrypted security group issuance license to determine the security group membership requirements for the file. The DRM server 164 can access a security group database 170 of the user database 168 to determine which security groups the user accessing the file belongs. The DRM server can generate and issue an end-user security group license to the user. The end-user security group license can include the security group key (that is was encrypted with in the encrypted security group issuance license) for each security group for which the user is a member.

The DRM server 164 provides the end-user security group license to the security service 156. If the user is a member of each and every security group identified in the security group issuance license, the security service 156 can re-create the combination key used to encrypt the protected data. However, if the user lacks membership to even one of the security groups identified in the security group issuance license, the security service 156 will be unable to re-create the combination key. If the combination key is successfully re-created, the security service 156 can decrypt the encrypted protected data (of the group encrypted data) to reveal the protected data. The protected data is forwarded to the security applet 158. The security applet 158 swaps (e.g., replaces) the group encrypted data for the protected data, such that the protected data (in unencrypted form) can be shown (e.g., displayed or played) to the user accessing the file.

Figure 5:
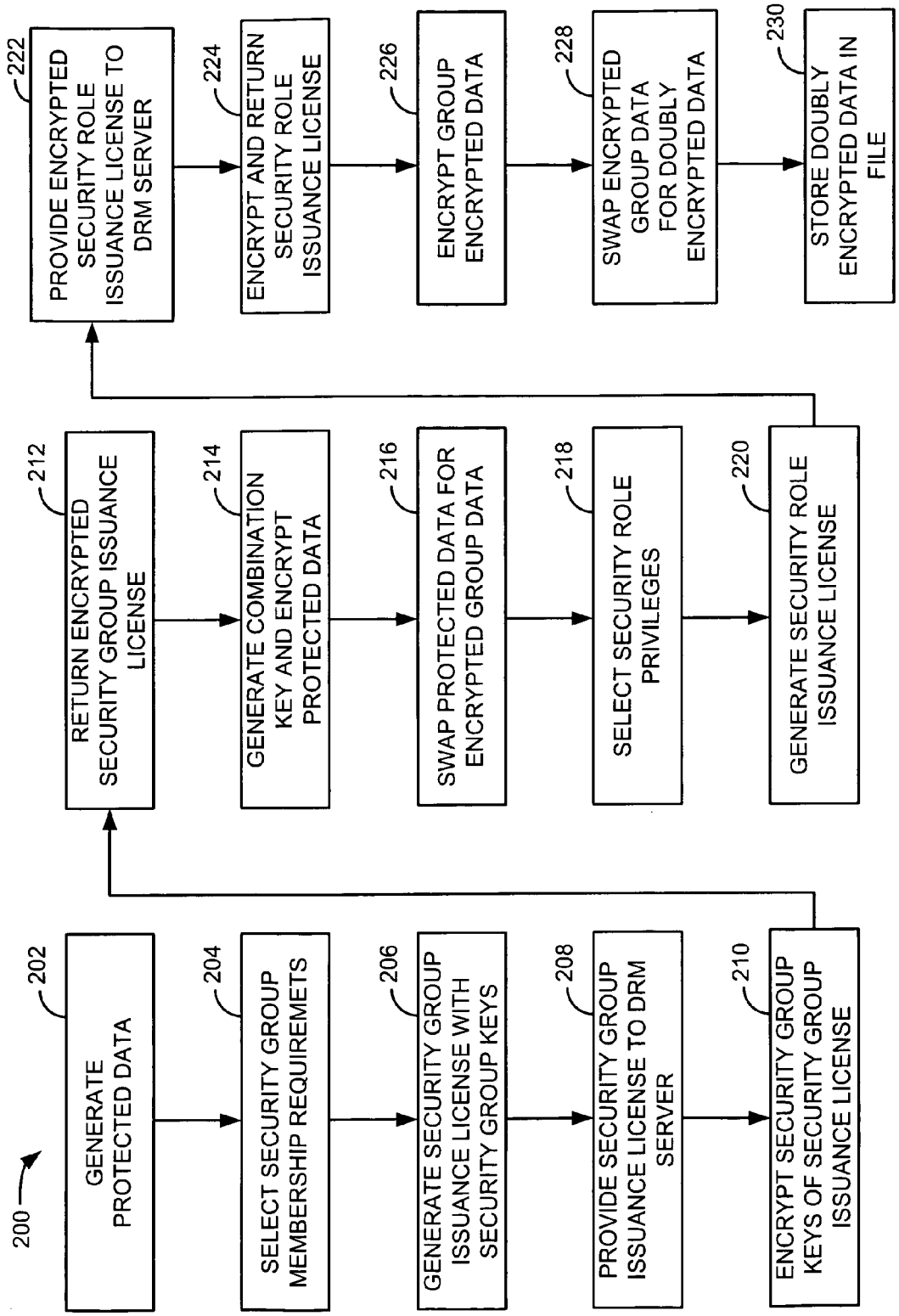
FIG. 5 illustrates a flow chart of a methodology for storing data securely in accordance with an aspect of the invention.
Figure 6:
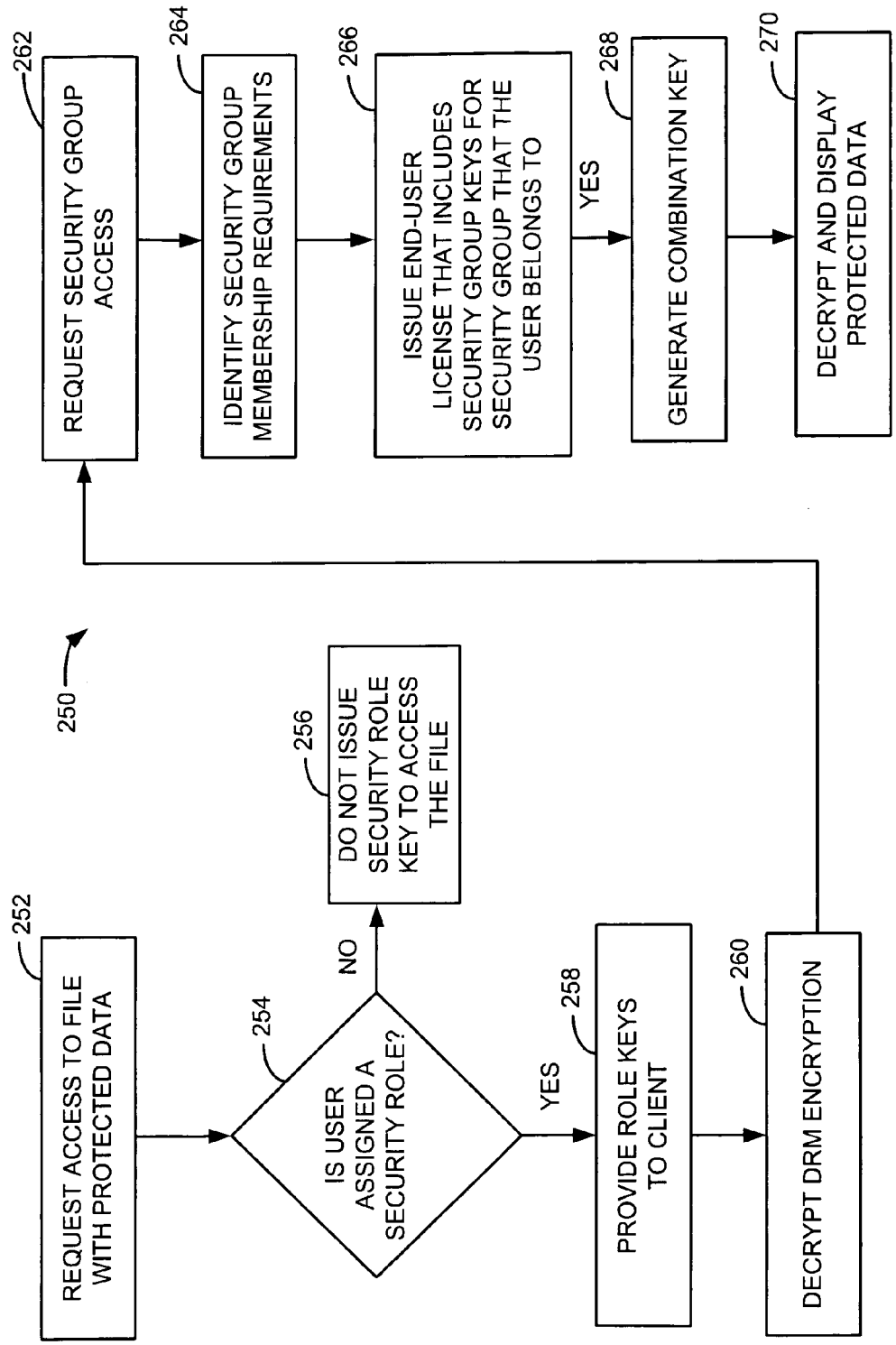
FIG. 6 illustrates a flow chart of a methodology for accessing data securely stored in accordance with an aspect of the invention.

In view of the foregoing structural and functional features described above, methodologies will be better appreciated with reference to FIGS. 5 and 6. It is to be understood and appreciated that the illustrated actions, in other embodiments, may occur in different orders and/or concurrently with other actions. Moreover, not all illustrated features may be required to implement a method.

FIG. 5 illustrates a flow chart of a methodology 200 for securely storing data in accordance with an aspect of the invention. At 202, protected data is generated, for example, with an application (e.g., an Office Suite application, an email system or a media player) running on a client (e.g., a computer with a graphical user interface). The protected data can be sensitive data to which a user of the client can limit access. At 204, when the user selects to store the data (e.g., save a file, copy the protected data, etc.), a security applet running on the application can prompt the user to select security group membership requirements to access the file. The security applet can extract the protected data and provide the protected data, along with the security group membership requirements to a security service running on the client.

At 206, the security service can generate a security group issuance license with unique security group keys for the protected data. The security service can create a unique security group key for each security group selected by the user. Additionally, the security service can digitally sign the security group issuance license, for example, with a signature certificate bound to the user. At 208, the security service can provide the signed security group issuance license to a DRM server using public-key encryption techniques to protect the license in transit, which could be implemented as a MICROSOFT WINDOWS® server with RMS functionality.

At 210, the DRM server encrypts the security group keys in the security group issuance license to form an encrypted security group issuance license. The DRM server can encrypt the security group keys, for example, with a public key of the DRM server, or a symmetric encryption key specifically generated by the DRM server for the protected data. In such a situation (employment of the specifically generated symmetric encryption key), the symmetric encryption key can be protected, for example, by encrypting the symmetric encryption key with the DRM server's public key, and the symmetric encryption key can be added to the security group issuance license. At 212, the DRM server returns the encrypted security group issuance license to the security service of the client. At 214, the security service can generate a combination key using a one-way hashing function with all of the security group keys. The combination key can be used to encrypt the protected data. The security service provides the encrypted protected data and the encrypted security group issuance license (which can be referred to collectively as group encrypted data) to the security applet. At 216, the security applet can swap (e.g., replace) the protected data for the group encrypted data.

At 218, the application can prompt the user to select security role privileges. After selected and configuring the security role privileges, at 220, the application generates a security role issuance license that includes role keys based on the privileges selected by the user. At 222, the security role issuance license can be provided to the DRM server. At 224 the DRM server encrypts and returns the encrypted security role issuance license to the application. At 226, the application encrypts the group encrypted data with the security role keys. The application can combine the group encrypted data and the security role issuance license to form doubly encrypted data. At 228, the application can swap (e.g., replace) the group encrypted data for the doubly encrypted data. At 230, the application can store the doubly encrypted data in file storage (e.g., a storage medium).

FIG. 6 illustrates an example of a flow chart of a methodology 250 for accessing protected data, (e.g., the protected data generated in FIG. 5) in accordance with an aspect of the invention. At 252, a user employing an application executing on a client system requests access to a file with protected data to a DRM server, which could be implemented as a MICROSOFT WINDOWS® server with RMS functionality. The request can include, for example, an encrypted security role issuance license that includes security role keys. The application can digitally sign the request, for example, with a signature certificate that is bound to the user.

At 254, the DRM server can authenticate the user by authenticating the digital signature of the request. Moreover, the DRM server can access a role database to determine if a security role has been assigned to the user. If no security role has been assigned to the user (e.g., NO) the process proceeds to 256. At 256, the DRM server does not issue a security role key to access the file.

If a security role has been assigned to the user (e.g., YES), the process proceeds to 258. At 258, the DRM server decrypts the security role issuance license reveal security role keys. One or more of the security role keys can be provided to the application based on the security role assigned to the user. The one or more security role keys could be provided, for example, in an end-user role security license. At 260, the client employs the one or more role keys to decrypt the doubly encrypted data to reveal group encrypted data. At 262, a security applet running on the application provides (via a security service) a digitally signed (using the signature certificate of the user) request to the DRM server for security group access to the file. The request can include, for example, an encrypted security group issuance license. At 264, the DRM server authenticates the user (by employing the digital signature of the request) and the DRM server decrypts and examines the security group issuance license to determine the group membership requirements for access to the file.

At 266, the DRM server accesses a group database to determine which security groups the user belongs. The DRM server issues an end-user license to the user that includes a security group key associated with the file for every security group that the user belongs to. At 268, the security service creates a combination key using a one-way hashing function with the security group keys provided with the end-user security group license. If the user is a member of each and every security group identified in the security group issuance license, the combination key can be employed to decrypt the group protected data, thus revealing the protected data. However, if the user is not a member of even one of the security groups identified in the security group issuance license, the generated combination key will not be able to decrypt the protected data. At 270, the security service decrypts the group encrypted data (assuming that the user is a member of each and every security group identified in the security group issuance license), thus revealing the protected data. The security service forwards the protected data to the security applet, which causes the application to provide (e.g., display and/or play) the protected data to the user.

Figure 7:
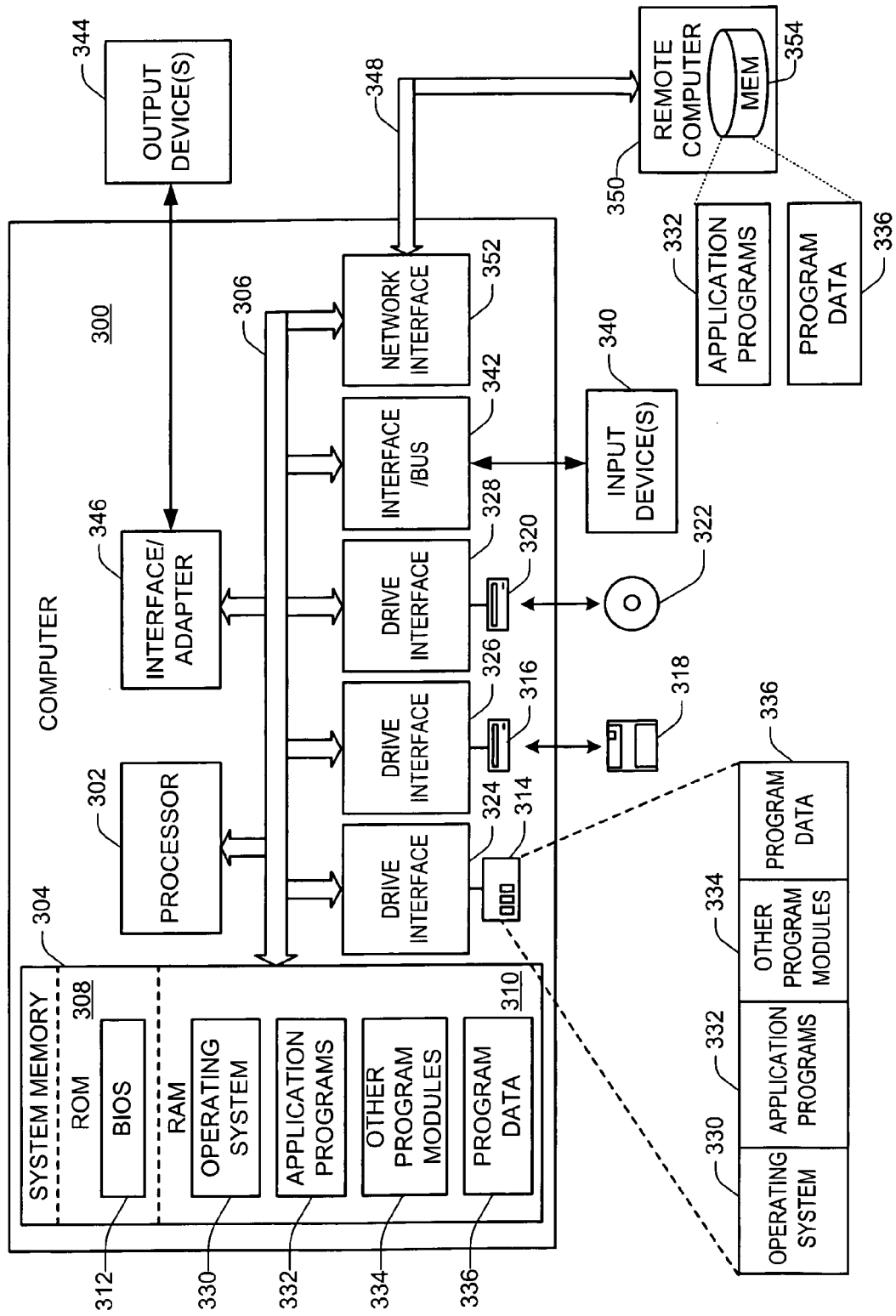
FIG. 7 illustrates a schematic block diagram of an exemplary operating environment for a system configured in accordance with an aspect of the invention.

FIG. 7 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the client and/or server executing instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 328, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336. The program modules could be employed, for example, to implement at least a portion of a system and/or methodologies for managing security rights to protected data, as shown and described with respect to FIGS. 1-6. For instance, the program modules could be employed to request, edit, store and encrypt data, as discussed herein.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346. The visual display could be used, for example, to display a graphical user interface, as discussed herein.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A system for managing security rights of protected data, the system having a plurality of security groups, the system comprising:
    a client configured to generate the protected data, wherein a user of the client is a member of a subset of the plurality of security groups, the client comprising:
        a key generator configured to generate a plurality of security group keys, wherein each security group key is associated with a security group selected by the user of the client, and wherein each security group key comprises an encryption key;
        a combination key generator configured to generate a combination key based on the plurality of security group keys, wherein the client is configured to encrypt the protected data with the combination key; and
        an issuance license generator that generates an issuance license that includes the plurality of security group keys;
    a security applet configured to:
        replace the protected data with group encrypted data, wherein the group encrypted data comprises the issuance license with the encrypted security group keys and the protected data encrypted with the combination key;

generate a security role issuance license that includes (i) a first security role key associated with a first set of privileges to the protected data, the first set of privileges being for a first security role define by digital rights management (DRM) functionality and (ii) a second security role key associated with a second set of privileges to the protected data, the second set of privileges being for a second security role defined by DRM functionality; and doubly encrypt at least a portion the group encrypted data based on the first security role key and the second security role key to form doubly encrypted data; and a server configured with DRM functionality, wherein the server is configured to:

authenticate the client;

encrypt the security group keys in the issuance license with a first security key and return the issuance license with the encrypted security group keys to the client; and encrypt the security role keys with a second security key, different than the first security key wherein the doubly encrypted data is decryptable by an entity possessing:

an end-user role license comprising one or more keys employable to reveal a portion of the group encrypted data; and an end-user security group license comprising each of the plurality of security group keys.

2. The system of claim 1, where the client is a first client, further comprising a second client configured request access to a file with the protected data from the server, wherein the server is configured to authenticate a user of the second client, wherein the authentication of the user of the second client comprises verifying that the user of the second client is a member of every security group identified in the encrypted issuance license.

3. The system of claim 2, wherein the sever is configured to provide one of the first security role key and the second security role key to the second client based on a security role assigned to the user of the second client.

4. The system of claim 1, wherein the doubly encrypted data contains at least the first security role key, the second security role key and the group encrypted data.

5. The system of claim 1, wherein the client is configured to electronically sign the issuance license with a signature certificate associated with the user of the client.

6. The system of claim 1, wherein the subset of security groups selected by the user of the client comprises at least three security groups.

7. The system of claim 1, wherein the first set of privileges includes reading and modifying privileges to the protected data.

8. The system of claim 7, wherein the second set of privileges includes reading privileges to the protected data and excludes printing or modifying privileges to the protected content.

9. The system of claim 1, wherein the first set of privileges includes reading privileges to the protected content and excludes modifying privileges to the protected content.

10. The system of claim 1, wherein the security applet is further to replace the group encrypted data with the doubly encrypted data.

11. A non-transitory computer readable medium having computer executable instructions stored therein, the computer executable instructions, when executed performing a method, the method comprising:

generating the protected data;

selecting security group membership requirements for the protected data, wherein the security group membership requirements includes membership to each of a subset of a plurality of security groups;

generating an issuance license for the protected data that identifies the security group membership requirements for the protected data and unique security group keys comprising an encryption key for each security group selected;

encrypting the unique security group keys of the issuance license;

generating a combination key based on the unique security group keys;

encrypting the protected data with the combination key;

combining the encrypted protected data and the issuance license with the plurality of encrypted security group keys to form group encrypted data;

selecting a first set security role privileges for the protected data, the first set of security role privileges defining a first digital rights management (DRM) security role;

selecting a second set security role privileges for the protected data, the second set of security role privileges defining a second DRM security role, different from the first DRM security role;

generating a first security role key and a second security role key, wherein the first security role key provides the first set of security role privileges to the protected data and the second security role provides the second set of security role privileges to the protected data; and encrypting a portion of the group encrypted data with the first security role key and the second security role key;

receiving a security role license comprising the first security role key and the second security role key in encrypted form;

combining (i) the portion of the group encrypted data that is encrypted with the first security role key and the second security role key and (ii) the security role license to form doubly encrypted data;

wherein the doubly encrypted data is decryptable by an entity possessing:

an end-user role license comprising one or more keys employable to reveal a portion of the group encrypted data; and an end-user security group license comprising each of the unique security group keys of the issuance license.

12. The non-transitory computer readable medium of claim 11, further comprising:

storing the doubly encrypted data on a storage medium as a file.

13. The non-transitory computer readable medium of claim 11, wherein the first set of security privileges includes reading and modifying privileges to the protected data.

14. The non-transitory computer readable medium of claim 11, wherein the second set of security privileges includes reading privileges to the protected data and excludes printing privileges to the protected data.

15. A method for accessing protected data, the method comprising:
- receiving, at the server computer, a request for access to a file with the protected data by a user, wherein the protected data is doubly encrypted with:
  - a combination key generated based on a plurality of security group keys; and
  - a first encryption role key associated with a first set of digital rights management (DRM) privileges to the protected data and a second encryption role key associated with a second set of digital rights management (DRM) privileges to the protected data and;
- authenticating the user at the server computer, wherein the authenticating includes determining a security role assigned to the user, wherein the security role defines DRM privileges;
- providing an end-user role license comprising one of a first security role key and a second security role key to a client computer for the user based on the security role assigned to the user, wherein first security role key provides the first set of DRM privileges for the protected data and the second security role key provides the second set of DRM privileges for the protected data, wherein the first set of DRM privileges and the second set of DRM privileges are different;
- decrypting, at the client computer, doubly encrypted data with the one of the first security role key and the second security role key provided to the user to provide a portion of group encrypted data that comprises an issuance license comprising the first encryption role key in encrypted form and the second encryption role key in encrypted form;
- receiving, at a server computer, a request for security group access to the protected data by the user;
- identifying, at the server computer, security group membership requirements of the protected data, wherein the membership requirements include membership to each of a subset of a plurality of security groups;
- determining, at the server computer, if the user is a member of each and every security group of the security group membership requirements;
- decrypting, at the server computer, the plurality of security group keys in an issuance license associated with the protected data, wherein each of the security group keys comprises an encryption key, wherein a given security group key is associated with a given security group;
- generating, at a client computer, the combination key with the plurality of security group keys; and
- decrypting, at the client computer, the portion of the group encrypted data to provide the protected data with the combination key.

16. The method of claim 15, further comprising providing, at the client computer, the protected data to the user.

17. The method of claim 16, wherein the protected data is provided to the user by a display of a graphical user interface.

18. The method of claim 15, wherein the first set of DRM privileges includes reading and modifying privileges to the protected data.

19. The method of claim 18, wherein the second set of DRM privileges includes reading privileges to the protected data and excludes printing privileges to the protected data.

* * * * *